(12) United States Patent
Perevosnik et al.

(10) Patent No.: US 6,790,911 B2
(45) Date of Patent: Sep. 14, 2004

(54) THERMOPLASTIC ELASTOMERS HAVING IMPROVED ADHESIVE PROTERTIES

(75) Inventors: Kathleen A. Perevosnik, Akron, OH (US); Sunny Jacob, Akron, OH (US); William Gary Stevenson, Uniontown, OH (US); Curtis Waddle, Canal Fulton, OH (US)

(73) Assignee: Advanvced Elastomer Systems, L.P., Akron, OH (US)

( * ) Notice: Subject to any disclaimer, the term of this patent is extended or adjusted under 35 U.S.C. 154(b) by 0 days.

(21) Appl. No.: 10/329,592

(22) Filed: Dec. 26, 2002

(65) Prior Publication Data

US 2004/0127643 A1 Jul. 1, 2004

(51) Int. Cl.$^7$ ............................. C08F 8/00; C08L 9/00; C08L 23/04; C08L 27/04; C08L 33/18
(52) U.S. Cl. ................ 525/191; 525/203; 525/206; 525/213; 525/214; 525/232; 525/238; 525/240; 525/241
(58) Field of Search ............................. 525/191, 203, 525/206, 213, 214, 232, 238, 240, 241

(56) References Cited

U.S. PATENT DOCUMENTS

| | | | |
|---|---|---|---|
| 2,356,128 A | 8/1944 | Thomas et al. | |
| 2,972,600 A | 2/1961 | Braidwood | 528/129 |
| 3,287,440 A | 11/1966 | Giller et al. | 525/139 |
| 4,212,787 A | 7/1980 | Matsuda et al. | 525/211 |
| 4,311,628 A | 1/1982 | Abdou-Sabet et al. | 260/33.6 |
| 4,594,390 A | 6/1986 | Abdou-Sabet et al. | 525/232 |
| 4,916,180 A | 4/1990 | Robinson et al. | 524/456 |
| 4,916,198 A | 4/1990 | Scheve et al. | 526/351 |
| 5,013,793 A | 5/1991 | Wang et al. | 525/195 |
| 5,021,500 A | 6/1991 | Puydak et al. | 524/525 |
| 5,070,111 A | 12/1991 | Dumbauld | 521/85 |
| 5,081,179 A | 1/1992 | Sezaki et al. | 524/526 |
| 5,100,947 A | 3/1992 | Puydak et al. | 524/423 |
| 5,157,081 A | 10/1992 | Puydak et al. | 525/237 |
| 5,210,136 A * | 5/1993 | Miller et al. | 525/74 |
| 5,290,886 A | 3/1994 | Ellul | 524/515 |
| 5,397,832 A | 3/1995 | Ellul | 524/515 |
| 5,504,171 A | 4/1996 | Etherton et al. | 526/336 |
| 5,567,370 A | 10/1996 | Deseke et al. | 264/53 |
| 5,656,693 A | 8/1997 | Ellul et al. | 525/171 |
| 5,670,595 A | 9/1997 | Meka et al. | 526/336 |
| 5,786,403 A | 7/1998 | Okada et al. | 521/134 |
| 5,824,400 A | 10/1998 | Petrakis et al. | 428/218 |
| 5,929,165 A * | 7/1999 | Tasaka et al. | 525/92 F |
| 5,936,028 A | 8/1999 | Medsker et al. | 524/506 |
| 5,972,519 A | 10/1999 | Niessaer et al. | 428/474.4 |
| 6,100,334 A * | 8/2000 | Abdou-Sabet | 525/191 |
| 6,255,389 B1 | 7/2001 | Ouhadi et al. | 525/76 |
| 6,316,068 B1 | 11/2001 | Masubuchi et al. | 428/35.7 |
| 6,437,030 B1 | 8/2002 | Coran et al. | 524/101 |
| 6,451,915 B1 | 9/2002 | Ellul et al. | 525/191 |

FOREIGN PATENT DOCUMENTS

| | | |
|---|---|---|
| EP | 0 753 529 | 1/1997 |
| EP | 0 872 516 | 10/1998 |
| WO | WO 01/55257 | 8/2001 |

OTHER PUBLICATIONS http://www.knovel.com/knovel2/SearchResults.jsp.*

* cited by examiner

Primary Examiner—Nathan M. Nutter
(74) Attorney, Agent, or Firm—William A. Skinner; William G. Muller

(57) ABSTRACT

A thermoplastic vulcanizate prepared by dynamically vulcanizing a halogenated butyl rubber within a mixture that includes the halogenated butyl rubber and from about 10 to about 100 parts by weight of a crystalline thermoplastic resin per 100 parts by weight rubber, to thereby form a thermoplastic vulcanizate, where the thermoplastic resin includes a resin other than polyethylene, melt mixing the thermoplastic vulcanizate with about 5 to about 75 parts by weight of polyethylene resin per 100 parts by weight rubber, from about 3 to about 60 parts by weight of a tackifier per 100 parts by weight rubber, and from about 5 to about 250 parts by weight of a block copolymer containing at least the structure S-B/S-S per 100 parts by weight rubber, where the S block of the block copolymer has a glass transition temperature above about 25° C., the B/S block has a glass transition temperature below about 25° C., and the S content of the B/S block is from about 40 to about 60 percent by weight of said S/B block, the diene content of the total block copolymer is less than 40 weight percent, and the B/S block amount to at least 50 weight percent of the total block copolymer.

14 Claims, No Drawings

THERMOPLASTIC ELASTOMERS HAVING IMPROVED ADHESIVE PROTERTIES

FIELD OF THE INVENTION

This invention relates to thermoplastic elastomers having improved adhesive properties and processes for making the same.

BACKGROUND OF THE INVENTION

Thermoplastic elastomers are known. They have many of the properties of thermoset elastomers, yet they are processable as thermoplastics. One type of thermoplastic elastomer is a thermoplastic vulcanizate, which may be characterized by finely-divided rubber particles dispersed within a plastic. These rubber particles are crosslinked to promote elasticity. Thermoplastic vulcanizates are conventionally produced by dynamic vulcanization, which is a process whereby a rubber is cured or vulcanized within a blend with at least one non-vulcanizing polymer while the polymers are undergoing mixing or masticating at some elevated temperature, preferably above the melt temperature of the non-vulcanizing polymer.

Conventional thermoplastic vulcanizations, however, are typically not useful as adhesives. The plastic phase, which is typically non-polar, generally serves as the matrix of the blend. As a result, the rich non-polar surface of the blend reduces its ability to adhere to metal or other polar substrates, including many engineering resins. The adhesion problem is further exacerbated as attempts are made to harden the thermoplastic vulcanizate. As those skilled in the art appreciate, thermoplastic vulcanizates can be hardened by increasing the plastic content. As a result, however, the amount of plastic (i.e., non-polar material) at the surface is increased, which thereby further reduces the ability of thermoplastic vulcanizate to adhere to polar substrates.

Several attempts to improve the adhesive properties of thermoplastic vulcanizates have been made. In one instance, functionalized polyolefins have been added. In another, copolymers of polyamides and functionalized polyolefins have been added to improve adhesion to polyamides. In another instance, block copolymers of functionalized olefins, thermoplastic polyurethane, copolyester or copolyamide, and isocyanates have been added.

While these attempts have made some advancements in the art, there is a continued need to find other solutions to the adhesion problem.

SUMMARY OF THE INVENTION

In general the present invention provides a thermoplastic vulcanizate prepared by dynamically vulcanizing a halogenated butyl rubber within a mixture that includes the halogenated butyl rubber and from about 10 to about 100 parts by weight of a crystalline thermoplastic resin per 100 parts by weight rubber, to thereby form a thermoplastic vulcanizate, where the thermoplastic resin includes a resin other than polyethylene, melt mixing the thermoplastic vulcanizate with about 5 to about 75 parts by weight of polyethylene resin per 100 parts by weight rubber, from about 3 to about 60 parts by weight of a tackifier per 100 parts by weight rubber, and from about 5 to about 250 parts by weight of a block copolymer containing at least the structure S-B/S-S per 100 parts by weight rubber, where the S block of the block copolymer has a glass transition temperature above about 25° C., the B/S block has a glass transition temperature below about 25° C., and the S content of the B/S block is from about 40 to about 60 percent by weight of said S/B block, the diene content of the total block copolymer is less than 40 weight percent, and the B/S block amount to at least 50 weight percent of the total block copolymer.

The present invention also includes a thermoplastic vulcanizate comprising a vulcanized rubber, a thermoplastic resin other than polyethylene, a polyethylene resin, a flexible block copolymer, and a tackifier.

The present invention further includes a process for forming a thermoplastic elastomer mixture comprising dynamically vulcanizing a rubber within a mixture that includes the rubber and a crystalline thermoplastic resin, to thereby form a thermoplastic vulcanizate, and mixing the thermoplastic vulcanizate with a block copolymer containing at least the structure S-S/B-S.

The addition of a flexible block copolymer together with a high density polyethylene and a tackifier to thermoplastic vulcanizates has advantageously led to the discovery that the adhesion of thermoplastic vulcanizates can be improved. Significantly, this improvement has led to technologically useful thermoplastic vulcanizates even at higher hardness levels. Furthermore, where butyl rubber is employed as the rubber component, and even more advantageously halogenated butyl rubber, the adhesive properties of the thermoplastic vulcanizate is greatly improved.

DETAILED DESCRIPTION OF ILLUSTRATIVE EMBODIMENTS

Thermoplastic vulcanizates characterized by technologically useful adhesion include a vulcanized rubber, a thermoplastic resin other than polyethylene, a polyethylene resin, a flexible block copolymer, and a tackifier. Other compounds typically included in thermoplastic vulcanizates may likewise be included. These thermoplastic vulcanizates are preferably prepared by dynamically vulcanizing the rubber within a mixture that includes the rubber and at least the thermoplastic resin.

Any rubber or mixture thereof that is capable of being crosslinked or cured can be used as the rubber component. Reference to a rubber may include mixtures of more than one rubber. Useful rubbers typically contain some degree of unsaturation in their polymeric main chain. Some non-limiting examples of these rubbers include elastomeric copolymers, butyl rubber, natural rubber, styrene-butadiene copolymer rubber, butadiene rubber, acrylonitrile rubber, halogenated rubber such as brominated and chlorinated butyl rubber, butadiene-styrene-vinyl pyridine rubber, urethane rubber, polyisoprene rubber, epichlolorohydrin terpolymer rubber, and polychloroprene. The preferred rubbers include butyl rubber and halogenated butyl rubber.

Butyl rubber includes copolymers and terpolymers of isobutylene and at least one other comonomer. Useful comonomers include isoprene, divinyl aromatic monomers, alkyl substituted vinyl aromatic monomers, and mixtures thereof. Exemplary divinyl aromatic monomers include divinyl styrene. Exemplary alkyl substituted vinyl aromatic monomers include α-methyl styrene and paramethyl styrene. These copolymers and terpolymers may also be halogenated such as in the case of chlorinated and brominated butyl rubber.

The preferred butyl rubber includes copolymers of isobutylene and isoprene, copolymers of isobutylene and paramethyl styrene, as described in U.S. Pat. No. 5,013,793, which is incorporated herein by reference, terpolymers of isobutylene, isoprene, and divinyl styrene, as described in U.S. Pat. No. 4,916,180, which is incorporated herein by reference, and star branched butyl rubber, as described in U.S. Pat. No. 6,255,389, which is incorporated herein by reference. These preferred copolymers and terpolymers may be halogenated.

In the case of the isobutylene-isoprene copolymer, the copolymer preferably include from about 0.5 to about 30, and more preferably from about 0.8 to about 5, percent by weight isoprene based on the entire weight of the copolymer with the remainder being isobutylene.

In the case of the isobutylene-paramethyl styrene copolymer, the copolymer preferably include from about 0.5 to about 25, and more preferably from about 2 to about 20, percent by weight paramethyl styrene based on the entire weight of the copolymer with the remainder being isobutylene. The isobutylene-paramethyl styrene copolymers are preferably halogenated, especially with bromine, and these halogenated copolymers preferably contain from about 0 to about 10 percent by weight, and more preferably from about 0.3 to about 7 percent by weight halogenation.

The preferred isobutylene-isoprene-divinyl styrene terpolymer preferably includes from about 95 to about 99, and even more preferably from about 96 to about 98.5, percent by weight isobutylene, and from about 0.5 to about 5, and even more preferably from about 0.8 to about 2.5, percent by weight isoprene based on the entire weight of the terpolymer, with the balance being divinyl styrene.

In the case of halogenated butyl rubbers, the preferred butyl rubbers will include from about 0.1 to about 10, more preferably from about 0.3 to about 7, and even more preferably from about 0.5 to about 3 percent by weight halogen based upon the entire weight of the copolymer or terpolymer.

The glass transition temperature (Tg) of the preferred butyl rubbers is less than about −55° C., more preferably less than about −58° C., more preferably less than about −60° C., and even more preferably less than about −63° C.

The Mooney viscosity ($ML_{1+8}$@125° C.) of the preferred butyl rubbers is from about 25 to about 75, more preferably from about 30 to about 60, and even more preferably from about 40 to about 55.

Butyl rubbers are often commercially prepared by polymerization at low temperature in the presence of a Friedel-Crafts catalyst as disclosed within U.S. Pat. Nos. 2,356,128 and 2,944,576. Other methods may also be employed.

Butyl rubber is commercially available from a number of sources as disclosed in the Rubber World Blue Book. For example, both halogenated and un-halogenated copolymers of isobutylene and isoprene are available under the tradename Exxon Butyl™ (ExxonMobil Chemical Co.), halogenated and un-halogenated copolymers of isobutylene and paramethyl styrene are available under the tradename EXXPRO™ (ExxonMobil Chemical Co.), and star branched butyl rubbers are available under the tradename STAR BRANCHED BUTYL™ (ExxonMobil Chemical Co.). Halogenated and non-halogenated terpolymers of isobutylene, isoprene, and divinyl styrene are available under the tradename Polysar Butyl™ (Bayer; Germany).

The term elastomeric copolymer refers to rubbery copolymers polymerized from ethylene, at least one α-olefin monomer, and optionally at least one diene monomer. The α-olefins may include, but are not limited to, propylene, 1-butene, 1-hexene, 4-methyl-1 pentene, 1-octene, 1-decene, or combinations thereof. The preferred α-olefins are propylene, 1-hexene, 1-octene or combinations thereof.

The diene monomers may include, but are not limited to, 5-ethylidene-2-norbornene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; 5-vinyl-2-norbornene and the like, or a combination thereof. The preferred diene monomers are 5-ethylidene-2-norbornene and 5-vinyl-2-norbornene. In the event that the copolymer is prepared from ethylene, α-olefin, and diene monomers, the copolymer may be referred to as a terpolymer or even a tetrapolymer in the event that multiple α-olefins or dienes are used.

Elastomeric copolymers are commercially available under the tradenames Vistalon™ (ExxonMobil Chemical Co.; Houston, Tex.), Keltan™ (DSM Copolymers; Baton Rouge, La.), Nordel™ IP (DuPont Dow Elastomers; Wilmington, Del.), ElastoFlo™ (Dow Chemical Company, Midland, Mich.), and Buna™ (Bayer Corp.; Germany).

The thermoplastic resin is a resin other than polyethylene. This resin may be referred to as the first thermoplastic resin. The preferred thermoplastic resin is a solid, generally high molecular weight plastic material. Preferably, the resin is a crystalline or a semi-crystalline polymer resin, and more preferably is a resin that has a crystallinity of at least 25 percent as measured by differential scanning calorimetry. Other polymers with a high glass transition temperature are also acceptable as the thermoplastic resin. The melt temperature of these resins should generally be lower than the decomposition temperature of the rubber. Reference to a thermoplastic resin will include a thermoplastic resin or a mixture of two or more thermoplastic resins.

The thermoplastic resins preferably have a number average molecular weight from about 80,000 to about 200,000, and a weight average molecular weight from about 200,000 to about 600,000. More preferably, these resins have a number average molecular weight from about 90,000 to about 150,000, and a weight average molecular weight from about 300,000 to about 500,000.

The thermoplastic resins generally have a melt temperature ($T_m$) that is from about 150 to about 175° C., preferably from about 155 to about 170° C., and even more preferably from about 160 to about 170° C. The glass transition temperature ($T_g$) of these resins is from about −5 to about 10° C., preferably from about −3 to about 5° C., and even more preferably from about 0 to about 2° C. The crystallization temperature ($T_c$) of these resins is from about 95 to about 130° C., preferably from about 100 to about 120° C., and even more preferably from about 105 to about 115° C. as measured by DSC and cooled at 10° C./min.

The thermoplastic resins generally have a melt flow rate that is greater than about 0.5 dg/min, preferably greater than about 30 dg/min, still more preferably greater than about 100 dg/min, and even more preferably greater than 500 dg/min. Melt flow rate is a measure of how easily a polymer flows under standard pressure, and is measured by using ASTM D-1238 at 230° C. and 2.16 kg load.

Exemplary thermoplastic resins include crystallizable polyolefins, polyimides, polyesters (nylons), poly (phenylene ether), polycarbonates, styrene-acrylonitrile copolymers, polyethylene terephthalate, polybutylene terephthalate, polystyrene, polystyrene derivatives, polyphenylene oxide, polyoxymethylene, and fluorine-containing thermoplastics. The preferred thermoplastic resins are crystallizable polyolefins that are formed by polymerizing α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene or ethylene or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof is also contemplated. These homopolymers and copolymers may be synthesized by using any polymerization technique known in the art such as, but not limited to, the "Phillips catalyzed reactions," conventional Ziegler-Natta type polymerizations, and metallocene catalysis including, but not limited to, metallocene-alumoxane and metallocene-ionic activator catalysis.

The flexible block copolymer includes at least two hard blocks or segments with at least one soft block or segment between the hard blocks.

The molecular weight of the flexible block copolymer is typically greater than about 70 kg/mole, preferably from about 100 kg/mole to about 250 kg/mole, and more preferably from about 125 kg/mole to about 200 kg/mole.

The ratio of the length of the first hard segment to the soft segment to the second hard segment is preferably 10–20:60–80:10–20, more preferably 12–18:65–75:12–18, and more preferably 15:70:15.

The soft blocks are characterized by a glass transition temperature (Tg) of less than 25° C., more preferably less than 0° C., even more preferably less than –20° C., and even more preferably less than about –35° C.

The soft block is preferably a random copolymer comprising units deriving from conjugated diene monomers and vinyl aromatic monomers. Suitable diene monomers include 1,3-butadiene, isoprene, piperylene, phenylbutadiene, and mixtures thereof. Those units deriving from conjugated diene monomers can optionally be hydrogenated. Suitable vinyl aromatic monomers include styrene, alkyl-substituted styrenes such as paramethyl styrene, and α-methyl styrene, as well as mixtures thereof.

The hard blocks are characterized by a glass transition temperature (Tg) of greater than 25° C., more preferably greater than 50° C., even more preferably greater than 75° C., and even more preferably greater than about 90° C.

The hard blocks preferably include polymeric units deriving from vinyl aromatic monomers. Useful vinyl aromatics include styrene, alkyl-substituted styrenes such as paramethyl styrene, and α-methyl styrene, as well as mixtures thereof.

The preferred flexible block copolymer is a block copolymer containing rigid or hard block deriving from styrene (S) and a soft or non-rigid mid-block deriving from butadiene and styrene (B/S), where the butadiene and styrene are statistically or randomly distributed throughout the block. These preferred block copolymers contain at least the structure S-B/S-S. The soft block (B/S block) preferably comprises from about 75 to about 30 weight percent monomeric units deriving from styrene and about 25 to about 70 weight percent units deriving from butadiene. This soft block preferably has about 60 to about 40 weight percent of its units deriving from styrene, and about 40 to about 60 weight percent of its units deriving from butadiene. The total block copolymer includes less than about 40 weight percent, and more preferably less than about 35 weight percent, of its units deriving from butadiene. The soft or non-rigid segment constitutes at least about 50 weight percent, and preferably at least about 70 weight percent, of the total block copolymer.

The preferred flexible block copolymers are known in the art as described in U.S. Pat. Nos. 6,177,517 B1, and 6,369,160 B1, which are incorporated herein by reference, as well as International Patent Applications WO 96/20249 and WO 96/23823, which is incorporated herein by reference. The preferred flexible block copolymers are typically prepared by butyllithium initiated sequential anionic polymerization, but coupling of a living S-SB diblock or bifunctional initiation methods are also known.

The preferred flexible block copolymer is commercially available under the tradename STYROFLEX™ 2G66 (BASF Aktiengesellschaft; Germany).

A number of polyethylene resins are useful in practicing this invention. The polyethylene resin may be referred to as the second thermoplastic resin.

The preferred polyethylene resins are preferably characterized by having a crystallinity in excess of 25%, more preferably in excess of 55%, more preferably in excess of 75%, and even more preferably in excess of 80%, as measured by differential scanning calorimetry. Also, the preferred polyethylene resins have a density in excess of about 0.5, more preferably greater than 0.75, even more preferably greater than 0.9, and even more preferably greater than 0.95.

Useful polyethylene resins have a number average molecular weight of from about 5,000 to about 200,000, and a weight average molecular weight of from about 20,000 to about 500,000, more preferably, these resins have a number average molecular weight from about 8,000 to about 100,000, and a weight average molecular weight from about 30,000 to about 200,000. The polydispersity of the preferred polyethylene resins is from about 3 to about 7, and more preferably from about 4 to about 5.

Useful polyethylene resins have a melt flow rate that is greater than about 5 dg/min, preferably greater than about 10 dg/min, still more preferably greater than about 30 dg/min, and even more preferably greater than about 50 dg/min. Melt flow rate is a measure of how easily a polymer flows under standard pressure, and is measured by using ASTM D-1238 at 190° C. and 2.16 kg load.

Useful high density polyethylene resins are available from a number of sources including those available under the tradename Alathon™ ETP H5057 (Equistar Chemicals; Houston, Tex.), and ESCORENET™ HD-6733 HDPE (ExxonMobil).

Useful tackifiers, also referred to as hydrocarbon resins, are low molecular weight amorphous, thermoplastic polymers derived from synthetic or natural monomers. These monomers include those derived from petroleum resins including trans-piperylene, aromatics such as styrene, 2-methyl-2-butene; terpene resins including limonene, and β-pinene; rosins such as abietic acid; and various cyclodienes. The resins may be hydrogenated.

Useful tackifiers have a number average molecular weight of from about 0.4 kg/mole to about 2.2 kg/mole and weight average molecular weight of from about 0.5 kg/mole to about 2.5 kg/mole, and more preferably, these tackifiers have a number average molecular weight from about 0.5 kg/mole to about 1.8 kg/mole and a weight average molecular weight from about 2.0 kg/mole to about 2.2 kg/mole.

The glass transition temperature ($T_g$) of useful tackifiers is from about 35° C. to about 90° C., preferably from about 50° C. to about 85° C., and even more preferably from about 60° C. to about 80° C., as measured by differential scanning calorimetry.

The Brookfield viscosity of useful tackifiers is from about 100 to about 5,000 cps, preferably from about 300 to about 2,000 cps, and more preferably from about 500 to about 1,500 cps, as measured at 177° C.

Methods for producing tackifiers are generally known in the art. As noted above, the tackifier resins may be manufactured from synthetic or natural monomers. Typically, these monomers are polymerized by employing thermal coupling techniques as well as numerous catalyst systems that employ transition metals such as aluminum trichloride.

Tackifier resins can be obtained from a variety of commercial sources. Preferred resins can be obtained under the tradename Escorez™ (ExxonMobil; Houston, Tex.). Especially preferred resins include Escorez™ 1000, 2000, 4000, 5000, 7000, and 8000.

Any curative that is capable of curing or crosslinking the rubber may be used. Therefore, depending on the rubber employed, certain curatives may be preferred. As is generally disclosed in U.S. Pat. Nos. 2,972,600, 3,287,440, 4,311,628, and 6,451,915, which are incorporated herein by reference, phenolic resins are particularly useful for curing rubbers such as elastomeric copolymers. Likewise, and as generally disclosed in U.S. Pat. No. 5,936,028, silicon-containing curatives, which generally include silicon hydride compounds having at least two SiH groups, are likewise useful for curing rubbers such as elastomeric copolymers. Still further, and as generally disclosed in U.S. Pat. No. 5,656,693, peroxide curatives are likewise useful for curing rubbers such as elastomeric copolymers.

Where non-halogenated butyl rubbers are employed, useful curing agents include phenolic resin cure systems, as described in U.S. Pat. No. 4,130,534, which is incorporated herein by reference.

The preferred phenolic resin curatives can be referred to as resole resins and are made by condensation of alkyl substituted phenols or unsubstituted phenols with aldehydes, preferably formaldehydes, in an alkaline medium or by condensation of bi-functional phenoldialcohols. The alkyl substituents of the alkyl substituted phenols typically contain 1 to about 10 carbon atoms. Dimethylol phenols or phenolic resins, substituted in para-positions with alkyl groups containing 1 to about 10 carbon atoms are preferred. These phenolic curatives are typically thermosetting resins and may be referred to as phenolic resin curatives or phenolic resins. These phenolic resins are ideally used in conjunction with a catalyst system. For example, non-halogenated phenol curing resins are preferably used in conjunction with halogen donors and, optionally, a hydrogen halide scavenger. Where the phenolic curing resin is halogenated, a halogen donor is not required but the use of a hydrogen halide scavenger, such as ZnO, is preferred.

As with non-halogenated butyl rubbers, halogenated butyl rubbers can be cured with phenolic resins. Typically, halogen donors are not required, although hydrogen halide scavengers are still preferred. In addition, halogenated butyl rubbers can be cured with peroxides as disclosed in U.S. Pat. No. 5,081,179. Examples of useful peroxides include di-tert-butyl peroxide, dicumyl peroxide, t-butylcumyl peroxide, α,α-bis(tert-butylperoxy) diisopropyl benzene, 2,5 dimethyl 2,5-di(t-butylperoxy)hexane, 1,1-di(t-butylperoxy)-3,3,5-trimethyl cyclohexane, -butyl-4,4-bis(tert-butylperoxy) valerate, benzoyl peroxide, lauroyl peroxide, dilauroyl peroxide, 2,5-dimethyl-2,5-di(tert-butylperoxy) hexene-3, and mixtures thereof. Also, diaryl peroxides, ketone peroxides, peroxydicarbonates, peroxyesters, dialkyl peroxides, hydroperoxides, peroxyketals and mixtures thereof may be used.

In addition to phenolic resins and peroxides, halogenated butyl rubbers can also be cured with zinc oxide, diamines, dithio carbamate-based cure systems, as described in U.S. Pat. Nos. 5,013,793 and 5,100,947, which are incorporated herein by reference, or bismaleimide-based cure systems, as described in U.S. Pat. Nos. 5,021,500 and 5,100,947, which are incorporated herein by reference.

In the case of dithio carbamates, such as butyl zimate, and bismaleimides, the use of complementary catalysts are preferred such as zinc oxide, zinc carboxylates, magnesium oxide, and mixtures thereof.

Where the rubber employed includes a butyl rubber including pendant vinyl groups, such as in the case of terpolymers of isobutylene, isoprene, and divinyl styrene, useful cure systems include silicon-containing curatives, such as silicon hydride compounds, or peroxides, as disclosed in U.S. Pat. No. 4,916,180, which is incorporated herein by reference.

Useful silicon hydride compounds include, but are not limited to, methylhydrogen polysiloxanes, methylhydrogen dimethyl-siloxane copolymers, alkyl methyl polysiloxanes, bis(dimethylsilyl)alkanes, bis(dimethylsilyl)benzene, and mixtures thereof.

Silicon-containing curatives are preferably used in the presence of a catalyst. These catalysts can include, but are not limited to, peroxide catalysts and catalysts including transition metals of Group VIII. These metals include, but are not limited to, palladium, rhodium, and platinum, as well as complexes of these metals. Platinum catalyst are preferred. For a further discussion of the use of hydrosilation to cure thermoplastic vulcanizates, reference can be made to U.S. Pat. No. 5,936,028, which is incorporated herein by reference.

Plasticizers, extender oils, synthetic processing oils, oligomeric extenders, or a combination thereof may be employed as extenders. The extender oils may include, but are not limited to, aromatic, naphthenic, and paraffinic extender oils. The preferred synthetic processing oils are polylinear α-olefins. Organic esters, alkyl ethers, or combinations thereof, may also be used. The compositions of this invention may include organic esters, alkyl ethers, or combinations thereof. U.S. Pat. No. 5,290,886 and 5,397,832 are incorporated herein in this regard. The addition of certain low to medium molecular weight organic esters and alkyl ether esters to the compositions of the invention dramatically lowers the $T_g$ of the polyolefin and rubber components, and of the overall composition, and improves the low temperature properties, particularly flexibility and strength. These organic esters and alkyl ether esters generally have a molecular weight that is generally less than about 10,000. It is believed that the improved effects are achieved by the partitioning of the low Tg ester into both the polyolefin and rubber components of the compositions. Particularly suitable esters include monomeric and oligomeric materials having an average molecular weight below about 2000, and preferably below about 600. The ester should be compatible, or miscible, with both the polyolefin and rubber components of the composition; i.e., that it mixes with the other components to form a single phase. The esters found to be most suitable were either aliphatic mono- or diesters or alternatively oligomeric aliphatic esters or alkyl ether esters. Polymeric aliphatic esters and aromatic esters were found to be significantly less effective, and phosphate esters were for the most part ineffective. Useful oligomeric extenders include copolymers of isobutylene and butene or copolymers of butadiene together with a complementary comonomer. These oligomeric extenders typically have a number average molecular weight of less than 1,000.

Useful oligomeric extenders are commercially available. For example, oligomeric copolymers of isobutylene and butene are available under the tradenames Polybutene™ (Soltex; Houston, Tex.), Indopol™ (BP; Great Britain), and Parapol™ (ExxonMobil). Oligomeric copolymers including butadiene are commercially available under the tradename Ricon Resin™ (Ricon Resins, Inc; Grand Junction, Colo.).

In addition to the thermoplastic resins, rubber, curatives and optional extender oils, the compositions of the invention may also include reinforcing and non-reinforcing fillers, antioxidants, stabilizers, rubber processing oil, lubricants, antiblocking agents, anti-static agents, waxes, foaming agents, pigments, flame retardants and other processing aids known in the rubber compounding art. These additives can comprise up to about 50 weight percent of the total composition. Fillers and extenders that can be utilized include conventional inorganics such as calcium carbonate, clays, silica, talc, titanium dioxide, carbon black and the like.

Preferably, compositions of this invention will contain a sufficient amount of the rubber to form rubbery compositions of matter. The skilled artisan will understand that rubbery compositions of matter are those that have ultimate elongations greater than 100 percent, and that quickly retract to 150 percent or less of their original length within about 10 minutes after being stretched to 200 percent of their original length and held at 200 percent of their original length for about 10 minutes.

Accordingly, the thermoplastic elastomer compositions of the present invention should comprise at least about 25 percent by weight rubber, preferably at least about 35 percent by weight rubber, even more preferably at least about 45 percent by weight rubber, and still more preferably at least about 50 percent by weight rubber. More specifically, the amount of rubber within the thermoplastic elastomer compositions is generally from about 25 to about 90 percent by weight, preferably from about 45 to about 85 percent by weight, and more preferably from about 60 to about 80 percent by weight based on the entire weight of the thermoplastic elastomer composition.

The thermoplastic elastomeric compositions should general comprise from about 10 to about 100 parts by weight (pbw), preferably from about 20 to about 60 pbw, and more preferably from about 25 to about 50 pbw, thermoplastic resin (i.e., the first thermoplastic resin which excludes polyethylene) per 100 parts by weight rubber (phr).

The thermoplastic elastomer compositions should generally comprise from about 50 to about 250 pbw, preferably from about 75 to about 150 pbw, and more preferably from about 95 to about 135 pbw, flexible block copolymer phr.

The thermoplastic elastomer compositions should generally comprise from about 5 to about 75 pbw, preferably from about 10 to about 50 pbw, and more preferably from about 15 to about 30 pbw, polyethylene resin (i.e., the second thermoplastic resin) phr.

The thermoplastic elastomer compositions should generally comprise from about 3 to about 60 pbw, preferably from about 8 to about 40 pbw, and more preferably from about 10 to about 25 pbw, tackifier phr.

The skilled artisan will be able to readily determine a sufficient or effective amount of vulcanizing agent to be employed without undue calculation or experimentation. The amount of vulcanizing agent should be sufficient to at least partially vulcanize the elastomeric polymer. Preferably, the elastomeric polymer is completely vulcanized.

Where a phenolic resin curative is employed, a vulcanizing amount curative preferably comprises from about 1 to about 20 pbw, more preferably from about 3 to about 16 pbw, and even more preferably from about 4 to about 12 pbw, phenolic resin per 100 pbw. The amount of a complimentary catalyst system is generally well known in the art as described in U.S. Pat. Nos. 2,972,600, 3,287,440, 4,311, 6285, 6,437,030, and 6,451,915, which are incorporated herein by reference.

Where a peroxide curative is employed, a vulcanizing amount of curative preferably comprises from about $1\times10^{-4}$ moles to about $2\times10^{-2}$ moles, more preferably from about $2\times10^{-4}$ moles to about $2\times10^{-3}$ moles, and even more preferably from about $7\times10^{-4}$ moles to about $1.5\times10^{-3}$ moles per 100 parts by weight rubber.

Where dithiocarbamates, such as butyl zimate, are employed, a vulcanizing amount of dithiocarbamate preferably comprises from about 0.1 to about 10 pbw, more preferably from about 0.5 to about 5 pbw, and even more preferably from about 1 to about 3 pbw, dithiocarbamate phr. Within this system, zinc oxide is preferably used as a complementary catalyst, in an amount from about 0.5 to about 10 pbw, preferably from about 1 to about 8 pbw, and more preferably from about 2 to about 6 pbw phr. A complementary amount of metal carboxylate, such as zinc stearate, is also preferably used and includes from about 0.1 to about 10 pbw, more preferably from about 0.5 to about 5 pbw, and even more preferably from about 1 to about 3 pbw, metal carboxylate phr.

Where silicon-containing curative is employed, a vulcanizing amount of curative preferably comprises from 0.1 to about 10 mole equivalents, and preferably from about 0.5 to about 5 mole equivalents, of SiH per carbon-carbon double bond.

The thermoplastic elastomer compositions should generally comprise from about 5 to about 300 pbw, preferably from about 20 to about 250 pbw, and more preferably from about 30 to about 100, extender phr. The quantity of extender oil added depends upon the properties desired, with the upper limit depending upon the compatibility of the particular oil and blend ingredients; this limit is exceeded when excessive exuding of extender oil occurs.

The thermoplastic elastomer compositions should generally comprise from about 5 to about 300 pbw, preferably from about 20 to about 80 pbw, and more preferably from about 40 to about 60 pbw, calcium carbonate phr. The presence of calcium carbonate in the thermoplastic elastomers compositions of this invention have been found to provide desirable heat transfer characteristics to the compositions, which is especially advantageous for injection molding.

The thermoplastic elastomer compositions should generally comprise from about 3 to about 75 pbw, preferably from about 5 to about 60 pbw, and more preferably from about 10 to about 50 pbw, filler phr. The use of and amount of filler, such as clay, can be altered to tailor the properties of the resultant composition.

The thermoplastic vulcanizates are preferably prepared by dynamically vulcanizing rubber within a mixture that includes the rubber and at least the thermoplastic resin. In one embodiment, the dynamic vulcanization can take place while the rubber is being mixed with all of the other ingredients within the composition (e.g., thermoplastic resin, polyethylene resin, tackifier, and flexible block copolymer). In another embodiment, the thermoplastic vulcanizates of this invention are prepared by a two-stage process. Within this two-stage process, the rubber is dynamically vulcanized within a mixture that includes at least the thermoplastic resin and curative. Once this feed stock thermoplastic vulcanizate is prepared, the feed stock is blended with at least the flexible block copolymer. In either step of this two-stage process, the other ingredients (e.g., polyethylene resin, tackifier, calcium carbonate) can be present together with the thermoplastic resin, the flexible block copolymer, or both. The blending of the flexible block copolymer into the feed stock thermoplastic vulcanizate preferably occurs at a temperature of about 150° C. to about 230° C., and more preferably from about 180° C. to about 210° C. In an especially preferred embodiment, dynamic vulcanization of the rubber takes place while the rubber is being mixed with the thermoplastic resin, the polyethylene resin, and the tackifier.

The term dynamic vulcanization refers to a vulcanization or curing process for a rubber contained in a thermoplastic elastomer composition, wherein the rubber is vulcanized under conditions of high shear at a temperature above the melting point of the polyolefin component. The rubber is thus simultaneously crosslinked and dispersed as fine particles within the polyolefin matrix, although as noted above other morphologies may also exist. Dynamic vulcanization is effected by mixing the thermoplastic elastomer components at elevated temperature in conventional mixing equipment such as roll mills, Banbury mixers, Brabender mixers, continuous mixers, mixing extruders and the like. One method for preparing thermoplastic vulcanizates is described in U.S. Pat. No. 4,594,390, which is incorporated herein by reference.

Those ordinarily skilled in the art will appreciate the appropriate quantities, types of cure systems, and vulcanization conditions required to carry out the vulcanization of the rubber. The rubber can be vulcanized by using varying amounts of curative, varying temperatures, and a varying time of cure in order to obtain the optimum crosslinking desired.

In addition to demonstrating the advantageous properties of conventional thermoplastic vulcanizates, the preferred thermoplastic vulcanizates of this invention are characterized by having improved adhesion to many polar surfaces. These surfaces include, but are not limited to, metal surfaces, engineering resins such as acrylonitrile-butadiene-styrene copolymer (ABS), polycarbonate (PC), ABS/PC alloys and blends, polystyrene (PS), high impact polystyrene (HIPS), polyphenylene oxide (PPO), polymethyl methacrylate (PMMA), polybutylene terephthalate (PBT), polyethylene terephthalate (PET), acrylonitrile styrene acrylic (ASA), polypropylene, polyethylene, and other olefinic polymers, including blends and alloys of these polymers, as well as glass and mineral filled versions thereof.

The preferred thermoplastic vulcanizates advantageously demonstrate a peal strength (ASTM D1876; 0.125" substrate thickness and 0.125" sample thickness) to ABS (CYCOLAC® GPM5600; General Electric) of greater than 4 pli, advantageously greater than 8 pli, and even more advantageously greater than 12 pli.

Furthermore, in addition to the foregoing advantageous characteristics, certain thermoplastic vulcanizates of this invention can likewise be characterized by having higher hardness. In fact, in certain embodiments of this invention, the thermoplastic vulcanizates are not only characterized by having the foregoing adhesion characteristics, but they are also characterized by having a hardness (Iso A) that is greater than about 30, even more advantageously greater than about 55, and even more advantageously greater than about 70.

Despite the fact that the rubber component is partially or fully cured, the compositions of this invention can be processed and reprocessed by conventional plastic processing techniques such as extrusion, injection molding, and compression molding. The rubber within the thermoplastic elastomers of this invention is usually in the form of finely-divided and well-dispersed particles of vulcanized or cured rubber, although a co-continuous morphology or a phase inversion is also possible.

The term vulcanized or cured rubber refers to an elastomeric polymer that has undergone at least a partial cure. The degree of cure can be measured by determining the amount gel, or conversely, the rubber that is extractable from the thermoplastic elastomer by using boiling xylene or cyclohexane as an extractant. This method is disclosed in U.S. Pat. No. 4,311,628. By using this method as a basis, the cured rubber of this invention will have a degree of cure where not more than 35 percent of the rubber is extractable, preferably not more than 15 percent, even more preferably not more than 10 percent, and still more preferably not more than 5 percent of the rubber is extractable. Alternatively, the degree of cure may be expressed in terms of crosslink density. Preferably, the crosslink density is from about 40 to about 160 moles per milliliter of rubber. All of these descriptions are well known in the art and described in U.S. Pat Nos. 5,100,947 and 5,157,081, which are incorporated herein by reference.

The compositions of this invention can be used in processes for making shaped articles by conventional processes such as co-injection molding, co-extrusion molding, co-blow molding (injection and extrusion), lamination, calendering, over molding by compression and injection, insert molding, and over-extrusion. The shaped articles obtained by these processes are multi-layer articles comprising at least one layer of the polymer substrate and at least one layer of an adhesive composition. The adhesive composition and the molded and shaped articles made therefrom in a variety of applications such as non-slip grips, soft touch labels and coatings, and consumer electronic, tool, and appliance parts.

In order to demonstrate the practice of the present invention, the following examples have been prepared and tested. The examples should not, however, be viewed as limiting the scope of the invention. The claims will serve to define the invention.

EXAMPLES

Example 1

Five feedstock thermoplastic vulcanizates were prepared from the ingredients listed in Table I by using dynamic vulcanization techniques. Specifically, they were prepared by using the techniques described in U.S. Pat. No. 4,594,390, which is incorporated herein by reference.

The feedstocks were then fed to a Banbury and combined with a flexible block copolymer and calcium carbonate according to the recipe in Table I (parts by weight). The feedstock, flexible block copolymer, and calcium carbonate were blended within the Banbury at 170°–180° C., for 5–10 minutes, at 110 r.p.m.

TABLE I

| Sample No. | 1 | 2 | 3 | 4 | 5 |
| --- | --- | --- | --- | --- | --- |
| Feed Stock Ingredients | | | | | |
| Butyl Rubber | 100 | 100 | — | — | 100 |
| Chlorinated Butyl Rubber | — | — | 100 | 100 | — |

TABLE I-continued

| Sample No. | 1 | 2 | 3 | 4 | 5 |
|---|---|---|---|---|---|
| Polypropylene | 45 | 25 | 45 | 45 | 25 |
| Polyethylene | — | 20 | — | — | 20 |
| Tackifier | — | — | — | 16.5 | 16.5 |
| Clay | 10 | 10 | 10 | 10 | 10 |
| SnCl$_2$ | 1.3 | 1.3 | — | — | 1.3 |
| Phenolic Resin | 5 | 5 | — | — | 5 |
| Zinc Oxide | 0.8 | 0.8 | 4 | 4 | 0.8 |
| Magnesium Oxide | — | — | 2 | 2 | — |
| Zinc Stearate | — | — | 1 | 1 | — |
| Butyl Zimate | — | — | 2 | 2 | — |
| Oil | 45 | 45 | 35 | 35 | 40 |
| Total Weight Final Blend | 207.10 | 207.10 | 199.00 | 215.50 | 218.60 |
| Feed Stock (wt. %) | 207.10 | 207.10 | 207.10 | 215.50 | 218.60 |
| Flexible Block Copolymer | 109.7 | 109.7 | 105.50 | 114.20 | 115.80 |
| Calcium Carbonate | 47.70 | 47.70 | 45.90 | 49.70 | 50.40 |
| Total Weight Physical Properties | 364.50 | 364.50 | 350.40 | 379.40 | 384.80 |
| Hardness | 77 | 72 | 80 | 77 | 70 |
| Specific Gravity | 1.05 | 1.05 | 1.06 | 1.06 | 1.06 |
| Bond Strength to ABS (pli) | 8 | 14 | 11 | 13 | 18 |

The butyl rubber was obtained under the tradename Butyl™ 268 (ExxonMobil); the chlorinated butyl rubber was obtained under the tradename ChloroButyl™ 1068 (ExxonMobil); the phenolic resin was obtained under the tradename SP-1045™ (Schenectady Int.; Schenectady, N.Y.); and the flexible block copolymer was obtained under the tradename Styroflex™ 2G66 (BASF; Germany). The polypropylene was an isotactic polypropylene that was characterized by a melting point of about 165° C. (DSC) and a melt flow index of about 750 g/10 min (D-1238, condition L). The polyethylene was a high density polyethylene characterized by a density of about 0.95 and a melt flow index of about 567 g/10 min (at 190° C.). The tackifier was characterized by glass transition temperature of about 65° C. (DSC), a weight average molecular weight (GPC) of about 430 g/mol, and a Brookfield viscosity of about 1,500 cps. The extender oil 15 was an oligomer of isobutylene and butene and was characterized by a weight average molecular weight ASTM (D-3593) of about 950 g/mol, and a viscosity at 100° C. (D-445) of about 200 cst.

Samples of the final blends were analyzed for hardness (ISO A), specific gravity, and bond strength. The results of the tests are set forth in Table I.

The ISO A test method mirrors ASTM D2240. Specific gravity was analyzed according to ASTM D792. Bond strength was determined according to ASTM D1876 with the modification that a hard substrate (ABS; Cycolac; General Electric) and soft substrate were used in place of two soft substrates. The substrate thickness was 0.125 inches and the sample thickness was 0.125 inches. Also, since adhesion is obtained at the substrate interface due to the inventive composition, no separate adhesive layer exists. For evaluation of insert molding conditions the harder thermoplastic substrates were produced in an "L" shaped mold cavity, then were removed and allowed to cool to ambient temperature. The shaped plastic profile was then inserted into another mold with a "T" shaped cavity, so as to take up one-half of the cavity. The molten composition of the invention was then injection molded onto the existing "L" to produce a "T-bar" article. For evaluation of compression molding conditions the thermoplastic "L" is produced as described, but is not removed from the mold. By either rotating the mold cavity to the next station or by using a sliding core plate, the molded "L" is immediately made accessible in a "T" cavity and the molten composition of the invention is injected. A standard tensiometer was then used to measure peel values for the "T-bars", by placing each tab of the upper "T" in separate grips. The grips were then pulled apart at 180 degrees. The force to peel was plotted against the crosshead travel which is also the peel length down the profile. The curve typically reached a peak and then descended to a plateau. The plateau values were recorded as the adhesion, expressed as pounds per linear inch (pli). This test is set forth in WO 96/23823 and WO 96/20249, which are incorporated herein by reference.

Various modifications and alterations that do not depart from the scope and spirit of this invention will become apparent to those skilled in the art. This invention is not to be duly limited to the illustrative embodiments set forth herein.

What is claimed is:

1. A thermoplastic vulcanizate comprising:
   a vulcanized rubber selected from one or more of the group consisting of elastomeric copolymer rubber, butyl rubber, natural rubber, styrene-butadiene copolymer rubber, butadiene rubber, acrylonitrile rubber, halogenated rubber such as brominated and chlorinated butyl rubber, butadiene-styrene-vinyl pyridine rubber, urethane rubber, polyisoprene rubber, epichlolorohydrin terpolymer rubber, and polychloroprene rubber;
   a thermoplastic resin selected from one or more of the group consisting of crystallizable polyolefins having a $T_m$ from about 150 to 175° C., polyimides, polyesters (nylons), poly(phenylene ether), polycarbonates, styrene-acrylonitrile copolymers, polyethylene terephthalate, polybutylene terephthalate, polystyrene, polystyrene derivatives, polyphenylene oxide, polyoxymethylene, and fluorine-containing thermoplastics;
   a polyethylene resin having a crystallinity in excess of 25% as measured by differential scanning calorimetry and an MFI (ASTM D-1238) greater than about 5 dg/min;
   a flexible block copolymer having at least two hard blocks or segments with at least one soft block or segment between the hard blocks wherein the soft block(s) is derived from conjugated diene monomers and vinyl aromatic monomers and the hard blocks are derived from vinyl aromatic monomers;
   a hydrocarbon resin tackifier; and,
   wherein said vulcanized rubber has been cured with a curative system selected from the group consisting of phenolic resins, silicon-containing curatives, zinc oxides, diamines, dithio carbamate-based cure systems, and bismaleimide-based cure systems, and is dispersed as fine particles within said thermoplastic vulcanizate.

2. The thermoplastic vulcanizate of claim 1, where the thermoplastic vulcanizate comprises from about 10 to about 100 parts by weight of said thermoplastic resin other than polyethylene per 100 parts by weight rubber, from about 5 to about 75 parts by weight of said polyethylene resin per 100 parts by weight rubber, from about 5 to about 250 parts by weight of said flexible block copolymer per 100 parts by weight rubber, and from about 3 to about 60 parts by weight of said tackifier per 100 parts by weight rubber.

3. The thermoplastic vulcanizate of claim 1, where said vulcanized rubber is a halogenated butyl rubber containing from about 0.1 to about 10 percent by weight halogenation.

4. The thermoplastic vulcanizate of claim 1, where said vulcanized rubber is cured with a phenolic resin cure system or a dithiocarbamate cure system.

5. The thermoplastic vulcanizate of claim 1, where said polyethylene resin has a melt flow rate in excess of 30 dg/min. per ASTM D-1238 at 190° C. and 2.16 kg load.

6. The thermoplastic vulcanizate of claim 1, where said at least two hard blocks have a glass transition temperature that is greater than about 25° C.

7. The thermoplastic vulcanizate of claim 6, where said at least one soft block has a glass transition temperature that is less than about 25° C.

8. The thermoplastic vulcanizate of claim 7, where said vinyl aromatic monomer is present within said at least one soft block in an amount from about 40 to about 60 percent by weight based upon the total weight of said at least one soft block.

9. The thermoplastic vulcanizate of claim 8, where the diene content of the total block copolymer is less than 40 weight percent and the at least one soft block amounts to at least 50 weight percent of the total block copolymer.

10. The thermoplastic vulcanizate of claim 1, where the flexible block copolymer contains at least the structure S-B/S-S.

11. The thermoplastic vulcanizate of claim 1, where the thermoplastic vulcanizate further comprises calcium carbonate.

12. A process for forming a thermoplastic vulcanizate, the process comprising:

dynamically vulcanizing a rubber within a mixture that includes the rubber, a crystalline thermoplastic resin, a polyethylene resin, and a hydrocarbon resin tackifier to thereby form a thermoplastic vulcanizate; and mixing the thermoplastic vulcanizate with a flexible block copolymer having at least two hard blocks or segments with at least one soft block or segment between the hard blocks wherein the soft block(s) is derived from conjugated diene monomers and vinyl aromatic monomers and the hard blocks are derived from vinyl aromatic monomers;

wherein said rubber is selected from one or more of the group consisting of elastomeric copolymer rubber, butyl rubber, natural rubber, styrene-butadiene copolymer rubber, butadiene rubber, acrylonitrile rubber, halogenated rubber such as brominated and chlorinated butyl rubber, butadiene-styrene-vinyl pyridine rubber, urethane rubber, polyisoprene rubber, epichlolorohydrin terpolymer rubber, and polychloroprene rubber;

said thermoplastic resin is selected from one or more of the group consisting of crystallizable polyolefins having a $T_m$ from about 150 to 175° C., polyimides, polyesters (nylons), poly(phenylene ether), polycarbonates, styrene-acrylonitrile copolymers, polyethylene terephthalate, polybutylene terephthalate, polystyrene, polystyrene derivatives, polyphenylene oxide, polyoxymethylene, and fluorine-containing thermoplastics; and, said polyethylene resin is one having a crystallinity in excess of 25% as measured by differential scanning calorimetry and an MFI (ASTM D-1238) greater than about 5 dg/min.

13. The process of claim 12, where said vulcanized rubber is a halogenated butyl rubber containing from about 0.1 to about 10 percent by weight halogenation.

14. The process of claim 13, where said thermoplastic resin is a crystallizable polyolefin having a $T_m$ from about 150 to 175° C.

* * * * *